United States Patent
Koene et al.

(10) Patent No.: US 8,202,614 B2
(45) Date of Patent: Jun. 19, 2012

(54) ADDITIVE PARTICLES HAVING SUPERHYDROPHOBIC CHARACTERISTICS AND COATINGS AND METHODS OF MAKING AND USING THE SAME

(75) Inventors: Bryan E. Koene, Blacksburg, VA (US); Martin E. Rogers, Blacksburg, VA (US); Jonas C. Gunter, Blacksburg, VA (US)

(73) Assignee: Luna Innovations Incorporated, Roanoke, VA (US)

( * ) Notice: Subject to any disclaimer, the term of this patent is extended or adjusted under 35 U.S.C. 154(b) by 462 days.

(21) Appl. No.: 12/420,618

(22) Filed: Apr. 8, 2009

(65) Prior Publication Data
US 2009/0298369 A1 Dec. 3, 2009

Related U.S. Application Data

(63) Continuation-in-part of application No. 11/500,895, filed on Aug. 9, 2006, now abandoned.

(51) Int. Cl.
*B32B 5/16* (2006.01)
*C04B 14/00* (2006.01)
*C04B 14/04* (2006.01)
*C04B 38/00* (2006.01)

(52) U.S. Cl. ... 428/403; 428/404; 428/702; 106/287.28; 106/672; 106/677; 106/816

(58) Field of Classification Search .......... 428/403–407, 428/702; 106/672, 677, 816, 287.28
See application file for complete search history.

(56) References Cited

U.S. PATENT DOCUMENTS

| 5,356,617 | A | 10/1994 | Schlossman |
| 5,688,864 | A * | 11/1997 | Goodwin ............ 524/858 |
| 5,798,406 | A | 8/1998 | Feret et al. |
| 6,103,379 | A | 8/2000 | Margel et al. |
| 6,416,774 | B1 | 7/2002 | Radin et al. |
| 6,420,456 | B1 * | 7/2002 | Koski ............ 523/213 |

(Continued)

FOREIGN PATENT DOCUMENTS

CN 1130640 9/1996

(Continued)

OTHER PUBLICATIONS

Woodward, "Contact Angle Measurements Using the Drop Shape Method", First Ten Angstroms, 465 Dinwiddie Street, Portsmouth, VA 23704, (8 pages), 2006.

(Continued)

*Primary Examiner* — Hoa (Holly) Le
(74) *Attorney, Agent, or Firm* — Nixon & Vanderhye P.C.

(57) ABSTRACT

Additive particles may be employed in sufficient amounts to impart superhydrophobicity to a coating system in which the additive particles are incorporated. The additive particles include carrier microparticles and a dense plurality of nanoparticles adhered to the surfaces of the carrier microparticles (e.g., preferably by electrostatic deposition or covalent bonding). The additive particles are advantageously incorporated into a coating material (e.g., a polymeric material) in amounts sufficient to render a substrate surface superhydrophobic when coated with the coating material. The substrate may be rigid (e.g., glass, ceramic or metal) or flexible (e.g., a polymeric film or sheet or a fabric). In some preferred embodiments, both the microparticle and nanoparticles are formed of silica and are surface treated with a hydrophobic treatment so as to impart superhydrophobic properties thereto. Especially preferred are particles treated with silicone fluid comprised of a polysiloxane and/or a perfluoro silane having between 1 and 40 carbon atoms.

36 Claims, 7 Drawing Sheets

U.S. PATENT DOCUMENTS

| | | | |
|---|---|---|---|
| 6,491,981 B1 * | 12/2002 | Guichard et al. | 427/387 |
| 6,743,467 B1 * | 6/2004 | Jones et al. | 427/180 |
| 6,767,587 B1 | 7/2004 | Brown | |
| 6,773,812 B2 * | 8/2004 | Chandler et al. | 428/403 |
| 6,783,704 B1 | 8/2004 | Anthes et al. | |
| 7,229,690 B2 | 6/2007 | Chan et al. | |
| 2003/0180369 A1 * | 9/2003 | Grisoni | 424/490 |
| 2004/0171700 A1 * | 9/2004 | Coronado et al. | 516/98 |
| 2004/0202872 A1 | 10/2004 | Fang et al. | |
| 2004/0224087 A1 | 11/2004 | Weimer et al. | |
| 2005/0115462 A1 | 6/2005 | Disalvo et al. | |
| 2005/0181195 A1 * | 8/2005 | Dubrow | 428/297.4 |
| 2005/0256257 A1 | 11/2005 | Betremieux et al. | |
| 2006/0019098 A1 | 1/2006 | Chan et al. | |
| 2006/0029808 A1 | 2/2006 | Zhai et al. | |
| 2006/0141148 A1 | 6/2006 | Voigt et al. | |

FOREIGN PATENT DOCUMENTS

| | | |
|---|---|---|
| CZ | 20014104 | 1/2003 |
| EP | 1 571 165 | 9/2005 |
| WO | WO 02/28956 | 4/2002 |
| WO | WO 2004/104116 | 12/2004 |
| WO | WO 2008/045022 | 4/2008 |

OTHER PUBLICATIONS

Shang et al, and Li et al, "Nanostructured superhydrophobic surfaces", Journal of Materials Science, 40, pp. 3587-3591, 2005.

Lau et al, "Superhydrophobic Carbon Nanotube Forests", Nano Letters, vol. 3, No. 12, pp. 1701-1705, 2003.

Fresnais et al, "Polyethylene ultrahydrophobic surface: synthesis and original properties", The European Physical Journal Applied Physics, 26, pp. 209-214, 2004.

Ren et al, "Preparation and characterization of an ultrahydrophobic surface based on a stearic acid self-assembled monolayer over polyethyleneimine thin films", Surface Science, 546, pp. 64-74, 2003.

Mock et al, "Towards ultrahydrophobic surfaces: a biomimetic approach", Journal of Physics: Condensed Matter, 17, S639-S648, 2005.

Zhai et al, "Stable Superhydrophobic Coatings from Polyelectrolyte Multilayers", Nano Letters, vol. 4, No. 7, pp. 1349-1353, 2004.

International Search Report dated Jul. 18, 2008 (2 pages).

Written Opinion dated Jul. 18, 2008 (5 pages).

* cited by examiner

ADDITIVE PARTICLES HAVING SUPERHYDROPHOBIC CHARACTERISTICS AND COATINGS AND METHODS OF MAKING AND USING THE SAME

CROSS-REFERENCE TO RELATED APPLICATION

This application is a continuation-in-part (CIP) of U.S. application Ser. No. 11/500,895 filed on Aug. 9, 2006 (now abandoned), the entire content of which is expressly incorporated hereinto by reference.

GOVERNMENT RIGHTS STATEMENT

This invention was made with Government support under Grant No. W911NF-04-C-084 awarded by the Defense Advanced Research Projects Agency (DARPA) and Grant No. FA9550-05-C-0061 issued by the Air Force Office of Scientific Research. The Government has certain rights to the invention.

FIELD

The present invention relates generally to additive particles that may be incorporated into matrices. In preferred forms, the present invention relates to additive particles that may be incorporated into polymeric matrices to form a coating that will impart superhydrophobic characteristics to substrates coated with the same.

BACKGROUND

Various proposals exist in the art for the production of superhydrophobic coatings. See in this regard, Shang et al, "Nanostructured superhydrophobic Surfaces", *J. Mater. Sci.* 40 (2005) 3587; Lau et al "Superhydrophobic Carbon Nanotube Forests", *Nano Letters,* 3 (2003) 1701; Ren et al, "Preparation and Characterization of an Ultrahydrophobic Surface Based on a Stearic Acid Self-Assembled Monolayer over Polyethyleneimine thin Films", *Surface Science,* 546 (2003) 64; Mock et al, "Towards Ultrahydrophobic Surfaces: A Biomimetic Approach", *J. Phys.: Condens. Matter* 17 (2005) S639; and Fresnais et al, "Polyethylene Ultrahydrophobic Surface: Synthesis and Original Properties" *Eur. Phys. J. Appl. Phys.* 26 (2004) 209, the entire content of each such prior publication being expressly incorporated hereinto by reference.

While superhydrophobic properties may in fact be achieved by the techniques disclosed in the prior publications identified above, they are typically limited by substrate size (i.e., are not suitable for coating onto a large substrate area), are time consuming and/or are not sufficiently robust for surface finishes. For example, the production of nanofibers by electrospinning cannot be used in a paint or coating application and is limited to relatively small substrates. Nanotubes produced on a surface by vapor deposition (or other methods) are limited to small substrates; require high temperature substrates and cannot be used in a coating. Self-assembled multilayers are likewise limited in substrate size and are impractical commercially due to their time consuming (e.g., several days) to produce a suitable structure. Photolithographic processes are not applicable as coating as they are limited in substrate size and require high temperature substrate. Plasma treatment process are not applicable as a coating; are limited in substrate size and are cost-prohibitive to use on a meaningful commercial scale.

Recently, the superhydrophobic behavior of the lotus leaf structure has been mimicked by providing a honeycomb-like polyelectrolyte multilayer surface with silica nanoparticles and then coating such highly textured surface with a semifluorinated silane. See, Zhai et al, "Stable Superhydrophobic Coatings from Polyelectrolyte Multilayers", *Nano Letters* 4 (2004) 1349-1353, the entire content of which is expressly incorporated hereinto by reference.

SUMMARY

Broadly, the present invention is embodied in additive particles which may be employed in sufficient amounts to impart superhydrophobicity to a coating system in which the additive particles are incorporated. In especially preferred embodiments, the additive particles of the present invention comprise carrier microparticles and a dense plurality of nanoparticles adhered to the surfaces of the carrier microparticles (e.g., preferably by electrostatic deposition or covalent bonding). In some preferred embodiments of the present invention, the additive particles are incorporated into a coating material (e.g., a polymeric material) in amounts sufficient to render a substrate surface superhydrophobic when coated with the coating material. The substrate may be rigid (e.g., glass, ceramic or metal) or flexible (e.g., a polymeric film or sheet or a fabric).

These and other aspects and advantages will become more apparent after careful consideration is given to the following detailed description of the preferred exemplary embodiments thereof.

BRIEF DESCRIPTION OF THE ACCOMPANYING DRAWINGS

Reference will hereinafter be made to the accompanying drawings, wherein like reference numerals throughout the various FIGURES denote like structural elements, and wherein.

DETAILED DESCRIPTION

A. Definitions

The terms below as used herein and in the accompanying claims are intended to have the following definitions.

"Filament" means a fibrous strand of extreme or indefinite length.

"Fiber" means a fibrous strand of definite length, such as a staple fiber.

"Yarn" means a collection of numerous filaments or fibers which may or may not be textured, spun, twisted or laid together.

"Fabric" means a collection of filaments, fibers and/or yarns which form an article having structural integrity. A fabric may thus be formed by means of conventional weaving, braiding, knitting, warp-knit weft insertion, spinbonding, melt blowing techniques to form structurally integrated masses of filaments, fibers and/or yarns.

"Textile article" is used generically to refer to filaments, fibers, yarns and fabrics. For convenience, the discussion below will reference textile articles, it being understood that such reference embraces filaments, fibers, yarns and fabrics.

"Functionalized" means that a material has been imbued with an ability to form a covalent bond with another functionalized material. For example, the materials employed according to the present invention may be imbued with amino, epoxy and/or halo functionality.

"Pigment" is meant to refer to a solid particulate material that may be incorporated or dispersed in a sea of matrix material. Additive particles may thus have generally circular or noncircular cross-sectional configurations.

"Nano" is meant to refer to a structure having an effective diameter of nanometer (nm) dimensions. The term nanoparticles is therefore intended to refer to three dimensional particulate structures having an average diameter of nano dimensions.

"Micro" is meant to refer to a structure having an effective diameter of micrometer (μm) dimensions. A microparticle is therefore intended to refer to three dimensional particulate structures having an average diameter of micro dimensions.

"Effective diameter" is meant to refer to the diameter of the smallest sphere which entirely encompasses a three dimensional particulate structure.

"Synthetic" means that the material is man-made from a substance and includes polymers synthesized from chemical compounds, modified or transformed natural polymers, and minerals. Synthetic fibers are thus fibers which are made from a man-made substance and are distinguishable from natural fibers such as cotton, wool, silk and flax.

"Superhydrophobic" means that a 1 μl sessile droplet of water on a surface forms a contact angle (θ) of greater than 150° using the drop shape method of contact angle measurement. The contact angle (θ) is the slope of the tangent to a sessile droplet on a film surface at the liquid-solid-vapor (LSV) interface line as calculated from the mathematical expression $\theta = 2 \tan^{-1} 2h/d$, where h and d represent the height and diameter, respectively, in millimeters of the sessile droplet.

It will also be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the structure in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

B. Description of the Preferred Embodiments

Figure 1A:
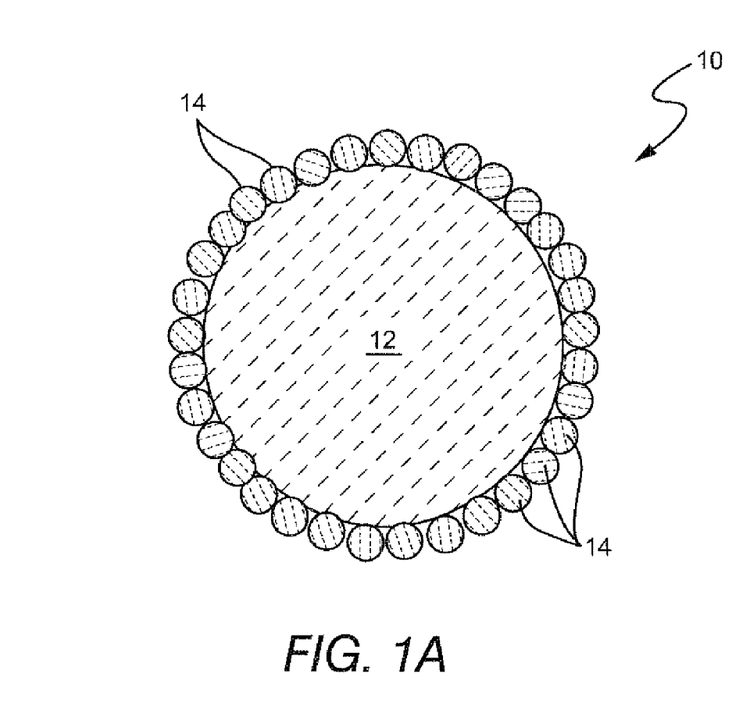
FIG. 1A is an enlarged schematic cross-sectional view of an exemplary additive particle in accordance with the present invention.

Accompanying FIG. 1A depicts in very schematic fashion a cross-section of an exemplary additive particle 10 in accordance with the present invention. As shown, the additive particle 10 is essentially comprised of a carrier microparticle 12 and a dense plurality of nanoparticles 14 adhered on an exterior surface thereof. The dense plurality of nanoparticles 14 will impart superhydrophobic character to a coating material.

Figure 1B:
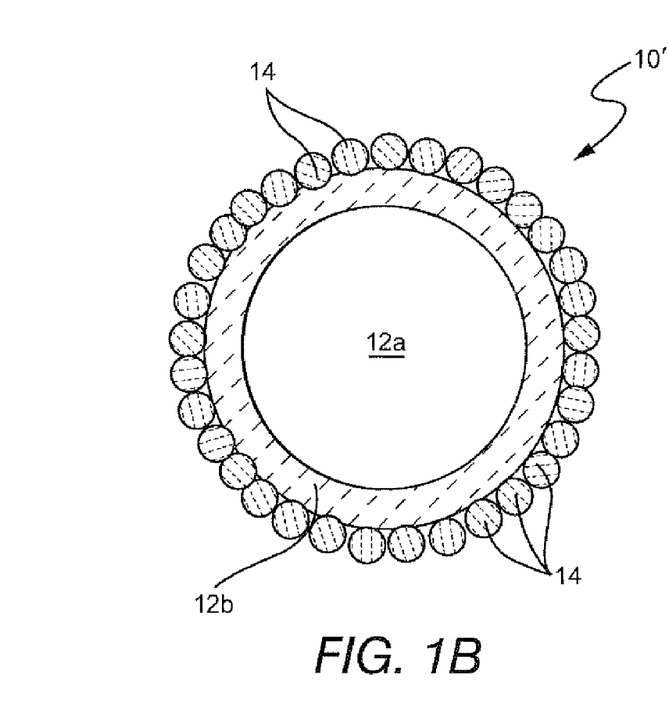
FIG. 1B is an enlarged schematic cross-sectional view of another exemplary additive particle in accordance with the present invention.

FIG. 1B depicts another possible embodiment of an additive particle 10' in accordance with the present invention which is substantially the same as the additive particle 10 depicted in FIG. 1A, but includes a carrier microparticle 12' which is hollow having an interior space 12a defined by the particle wall 12b. The additive particle 10 may thus be advantageous in coating systems employing the same as its lesser density will allow it to migrate to an exposed surface of the coating system when coated onto a substrate. Although not shown, the nanoparticles 14 adhered to the surface of the carrier microparticles 12 or 12' may likewise be hollow. For ease of discussion, reference will be made below only to the additive particle 10 depicted in FIG. 1A, but it should be understood that such a reference applies equally to additive particle 10' discussed above.

Figure 2:
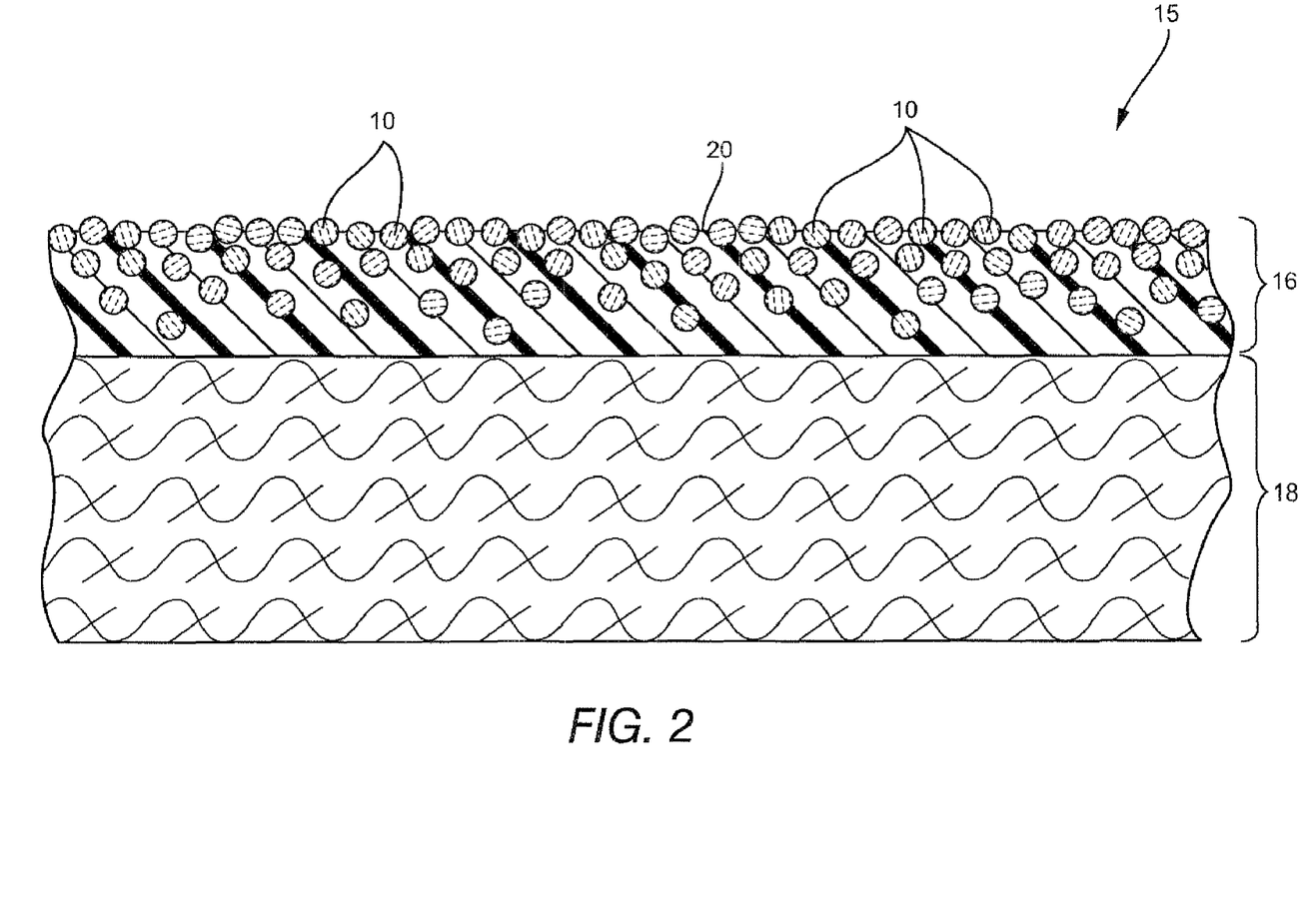
FIG. 2 is an enlarged schematic cross-sectional view of a coated substrate in accordance with the present invention which exhibits superhydrophobic properties.
Figure 3A:
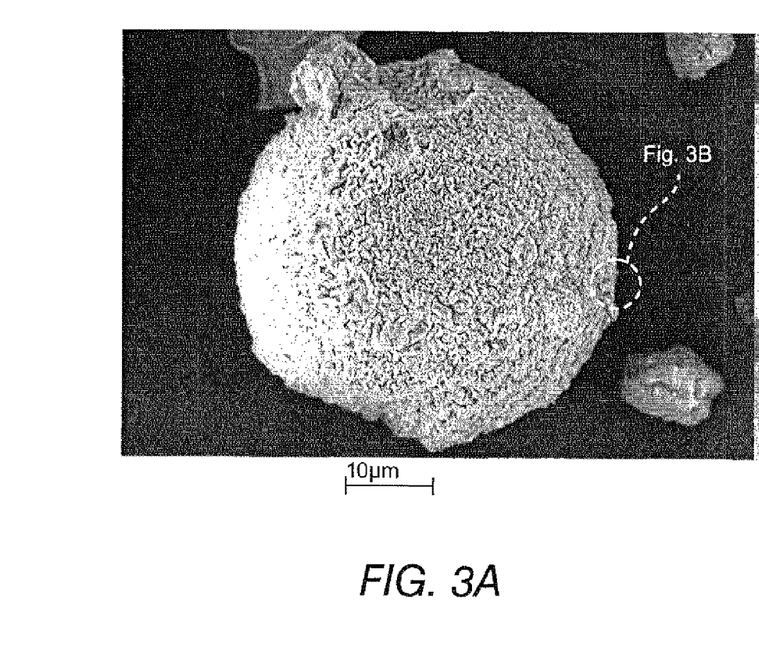
FIGS. 3A and 3B are scanning electron microscope (SEM) images at 500× and 200,000× magnification, respectively, of polymer carrier microspheres of approximately 50 μm effective diameter with $SiO_2$ nanoparticles of approximately 20 nm adhered to the surface.
Figure 3B:
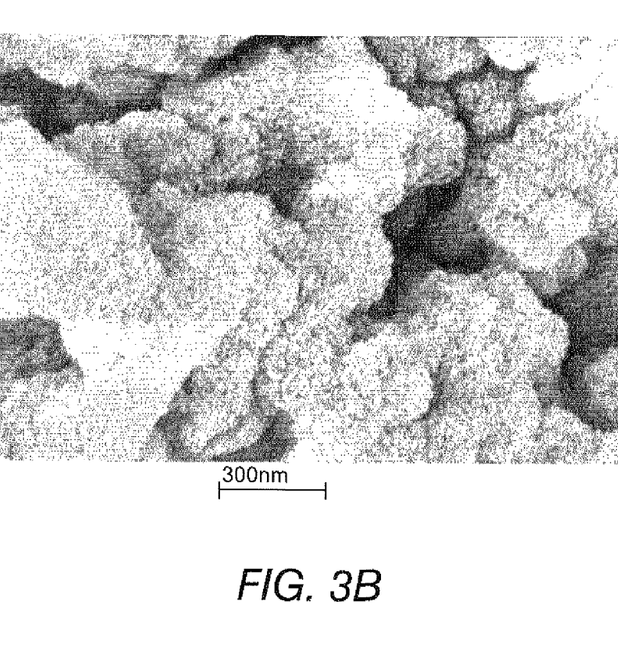

The exemplary coated substrate 15 in accordance with the present invention shown in accompanying FIG. 2 generally comprises a coating system 16 coated upon a substrate 18. As shown schematically therein the coating system 16 is comprised of the additive particles 10 incorporated into a polymeric coating material 20. The coating system 16 may thus be applied as a coating layer onto the underlying substrate 18. In this regard, the coating material 20 serves as a matrix to bind the particles 10 to an underlying substrate 18 and thereby form the coated substrate 15.

As shown, the substrate 18 is depicted as being a synthetic or natural textile material (e.g., cotton, polyester, nylon or the like). Using a textile material as the substrate 18 is however merely a presently preferred embodiment of the invention, as the substrate 18 could be any form of material to which the coating system 16 may be applied so as to impart superhydrophobicity. Thus, the substrate 18 may be formed of a rigid material (e.g., glass, ceramic, metal or the like), or may be in the form of a flexible film or sheet (e.g., a polymeric film, paper sheet or the like).

Also as shown, the additive particles 10 are depicted as being concentrated near the exposed surface of the coating material 20. As will be described in greater detail below, it is the exposure of the additive particles 10 at the surface of the coating material 20 which is believed to contribute substantially to the superhydrophobic properties that are achieved. Alternatively, the additive particles may be dispersed substantially homogenously throughout the thickness of the coating material 20 in which case a greater amount of the additive particles 10 may be needed in order to achieve comparable superhydrophobic properties.

The carrier microparticles 12 most preferably have an effective diameter of less than about 200 μm, more preferably between about 0.015 to about 150 μm, and most preferably between about 0.10 to about 100. In certain embodiments, the carrier microparticles 12 will have an effective diameter of between about 0.50 to about 60 μm. The nanoparticles 14 most preferably have an effective diameter of less than 200 nm, preferably between about 1 nm to less than 200 nm, more preferably between about 1 to about 100 nm, and most preferably between about 5 to about 70 nm.

The carrier microparticle 12 and nanoparticles 14 adhered on its surface may be formed of the same or different material. Exemplary materials from which the microparticle 12 and nanoparticle 14 may be formed include solid particles formed of natural or synthetic inorganic and/or organic materials. In preferred embodiments, the carrier microparticles 12 and nanoparticles 14 may be formed of the same or different inorganic metal oxide. Preferred inorganic metal oxides include, for example, silica, alumina, zirconia and titania. Silica is especially preferred. Other inorganic materials that may be employed in the practice of the present invention include metals and metal alloys, non-metal oxides, phosphates, phosphonates, nitrides, sulfides, sulfates, halides or other materials commonly employed in the art in the form of particulates.

While not wishing to be bound to any particular theory, it is presently surmised that it is the morphology that is achieved by means of the nanoparticles 14 being adhered onto the surface of the carrier microparticles coupled with the hydrophobic treatment of such nanoparticles 14 that achieves the superhydrophobicity properties of the resultant coatings. This theory is evidenced for example by the fact that comparably sized nanoparticles which are surface treated with a hydrophobic materials do not exhibit the exceptionally high contact angles as compared to the dual morphology additive particles 10 according to the present invention which have been surface treated in a similar manner.

The additive particles 10 in accordance with the present invention may be made by binding the nanoparticles 14 to the exterior surface of the carrier microparticle 12, most preferably by means of electrostatic deposition or covalent bonding. With electrostatic deposition, electrically charged nanoparticles 14 (i.e., either cationically or anionically charged nanoparticle may be deposited on the surface of a microparticle 12 of opposite electrical charge (i.e., anionically or cationically charged, respectively). The charging of the microparticles 12 and nanoparticles 14 may be accomplished using techniques well known to those in the art. For example, charged microparticles 12 may be introduced into an electrostatic spray of oppositely charged nanoparticles 14 so as to cause the latter to be electrostatically bound to the surface of the former.

Covalent bonding of the microparticles 12 and nanoparticles 14 may also be accomplished using known covalent bonding techniques. Thus, for example, one of the microparticles 12 and nanoparticles 14 may be functionalized with surface epoxide groups while the other of the microparticles 12 and nanoparticles 14 may be functionalized with surface an amine groups. The functionalized microparticles 12 and nanoparticles 14 may then be brought into contact with one another under conditions which cause the epoxy groups to react with the amine groups thereby causing the nanoparticles 14 to be covalently bonded to the microparticles. Surface functionality may be achieved using other reactive moieties and reaction techniques well known to those in the art, including for example, halogen groups, hydroxyl groups, cyano groups and the like.

In some preferred embodiments, the superhydrophobicity of the additive particles 10 is enhanced by treatment with a silicone fluid. Specifically, the silicone fluid may be one or both of a polysiloxane and an alkyl silane which is brought into contact with the additive particles in the form of an alcoholic solution. Upon removal of the alcohol solvent and excess silicone fluid (e.g., by heating the treated additive particles), an increased hydrophobicity is observed. Most preferably, the additive particles which are treated with a silicone fluid will comprise silica nanoparticles 14 surface adhered to the carrier microparticle 12. In such embodiments, the carrier microparticle 12 is also preferably formed of silica.

Preferred polysiloxanes are those having the following formula:

wherein each $R^1$ and $R^2$ is individually selected from the group consisting of hydrogen and substituted or unsubstituted, saturated or unsaturated alkyl or aryl hydrocarbyl groups having 1 to 40 carbon atoms, and wherein n ranges from greater than 0 to about 150. All $R^1$ need not be the same. All $R^2$ need not be the same. At least one $R^1$ or $R^2$ is not hydrogen. Some preferred hydrocarbyl groups include methyl, ethyl, propyl, vinyl allyl, and phenyl groups. Other suitable hydrocarbyl groups contain a hydrolyzable functional group. Such hydrolyzable functional groups include alkoxy group or ester derivative groups having 1-40 carbon atoms, such as, for example, methoxy ethoxy groups. Additionally, some hydrocarbyl groups are substituted with a fluoride, chloride, bromide, and iodide. In a preferred embodiment, the polysiloxane is a poly dialkyl siloxane, such as polydimethylsiloxane. In a preferred embodiment, R.sup.1 or R.sup.2 is an alkoxy, hydroxy or amino functionalized group.

In some embodiments, at least one $R^2$ of the polysiloxane is an amino functionalized hydrocarbyl group. Amino functionalized hydrocarbyl groups may have from 1 to about 40 carbon atoms. One particular amino-functionalized hydrocarbyl group is a 1-amino propyl group. However, the amino functionality need not be a primary amine, for instance, a 2-amino propyl group is also suitable. Another suitable amino-functionalized hydrocarbyl group is the ethyl amino propyl ($CH_2CH_2CH_2NHCH_2CH_2NH_2$) group. Other suitable amino-functionalized hydrocarbyl groups may include other functional groups or may include substituted amino groups such as —$CH_2CH_2(NHR^3)CH_2CH_3$ where $R^3$ is any alkyl or aryl group having from 1-40 carbon atoms. The amino functionality of the silicone fluids discussed above, may be reacted with numerous other chemical moieties designed to improve the hydrophobicity and durability of the coating formed from the hydrophobic surface treatment composition. Examples of such compounds include, but are not limited to, for example, long-chain epoxides, isocyanates, and fatty acid derivatives that react with the amino-substituted silicones at appropriate base-equivalent ratios. Manufacturing of such compounds is straightforward and permits the preparation of a wide variety of polysilicones tailored to suit particular purposes. Methods of manufacturing such compounds include, but are not limited to, those disclosed in U.S. Pat. Nos. 6,472, 468; 6,482,912; and 6,576,734 all of which are hereby incorporated by reference in their entirety. See also US Patent Application Publication 2004/0202872, the entirety of which is expressly incorporated hereinto by reference.

Suitable polysiloxanes include, but are not limited to, a linear, branched or cyclic polydimethylsiloxane; polysiloxanes having a hydroxyl group in the molecular chain such as silanol-terminated polydimethylsiloxane, silanol-terminated polydiphenylsiloxane, diphenylsilanol-terminated polydimethylphenylsiloxane, carbinol-terminated polydimethylsiloxane, hydroxypropyl-terminated polydimethylsiloxane and polydimethyl-hydroxyalkylene oxide methylsiloxane; polysiloxanes having an amino group in the molecular chain such as bis(aminopropyldimethyl)siloxane, aminopropyl-terminated polydimethylsiloxane, aminoalkyl group-containing, T-structured polydimethylsiloxane, dimethylamino-terminated polydimethylsiloxane and bis(aminopropyldimethyl)siloxane; polysiloxanes having a glycidoxyalkyl group in the molecular chain such as glycidoxypropyl-terminated polydimethylsiloxane, glycidoxypropyl-containing, T-structured polydimethylsiloxane, polyglycidoxypropylmethylsiloxane and a polyglycidoxypropylmethyldimethylsiloxane copolymer; polysiloxanes having a chlorine atom in the molecular chain such as chloromethyl-terminated polydimethylsiloxane, chloropropyl-terminated polydimethylsiloxane, polydimethyl-chloropropylmethylsiloxane, chloro-terminated polydimethylsiloxane and 1,3-bis(chloromethyl)tetramethyldisiloxane; polysiloxanes having a methacryloxyalkyl group in the molecular chain such as methacryloxypropyl-terminated polydimethylsiloxane, methacryloxypropyl-containing, T-structured polydimethylsiloxane and polydimethyl-methacryloxypropylmethylsiloxane; polysiloxanes having a mercaptoalkyl group in the molecular chain such as mercaptopropyl-terminated polydimethylsiloxane, polymercaptopropylmethylsiloxane and mercaptopropyl-containing, T-structured polydimethylsiloxane; polysiloxanes having an alkoxy group in the molecular chain such as ethoxy-terminated polydimethylsiloxane, polydimethylsiloxane having trimethoxysilyl on one terminal and a polydimethyloctyloxymethylsiloxane copolymer; polysiloxanes having a carboxyalkyl group in the molecular chain such as carboxylpropyl-terminated polydimethylsiloxane, carboxylpropyl-containing, T-structured polydimethylsiloxane and carboxylpropyl-terminated, T-structured polydimethylsiloxane; polysiloxanes having a vinyl group in the molecular chain such as vinyl-terminated polydimethylsiloxane, tetramethyldivinyldisiloxane, methylphenylvinyl-terminated polydimethylsiloxane, a vinyl-terminated polydimethyl-polyphenylsiloxane copolymer, a vinyl-terminated polydimethyl-polydiphenylsiloxane copolymer, a polydimethyl-polymethylvinylsiloxane copolymer, methyldivinyl-terminated polydimethylsiloxane, a vinyl terminated polydimethylmethylvinylsiloxane copolymer, vinyl-containing, T-structured polydimethylsiloxane, vinyl-terminated polymethylphenetylsiloxane and cyclic vinylmethylsiloxane; polysiloxanes having a phenyl group in the molecular chain such as a polydimethyl-diphenylsiloxane copolymer, a polydimethyl-phenylmethylsiloxane copolymer, polymethylphenylsiloxane, a polymethylphenyl-diphenylsiloxane copolymer, a polydimethylsiloxane-trimethylsiloxane copolymer, a polydimethyl-tetrachlorophenylsiloxane copolymer and tetraphenyldimethylsiloxane; polysiloxanes having a cyanoalkyl group in the molecular chain such as polybis(cyanopropyl)siloxane, polycyanopropylmethylsiloxane, a polycyanopropyl-dimethylsiloxane copolymer and a polycyanopropylmethyl-methyphenylsiloxane copolymer; polysiloxanes having a long-chain alkyl group in the molecular chain such as polymethylethylsiloxane, polymethyloctylsiloxane, polymethyloctadecylsiloxane, a polymethyldecyl-diphenylsiloxane copolymer and a polymethylphenetylsiloxane-methylhexylsiloxane copolymer; polysiloxanes having a fluoroalkyl group in the molecular chain such as polymethyl-3,3,3-trifluoropropylsiloxane and polymethyl-1,1,2,2-tetrahydrofluorooctylsiloxane; polysiloxanes having a hydrogen atom in the molecular chain such as hydrogen-terminated polydimethylsiloxane, polymethylhydrosiloxane and tetramethyldisiloxane; hexamethyldisiloxane; and a polydimethylsiloxane-alkylene oxide copolymer. Many polysiloxanes are commercially available as water repellents, such as Super Rain X formed mainly of polydimethylsiloxane (supplied by Unelko) and Glass Clad 6C formed mainly of polydimethylsiloxane whose terminal groups are replaced with chlorine atom (supplied by Petrarch Systems Inc.). The above polysiloxanes may be used alone or in combination. Other suitable polysiloxanes are those organic polysiloxanes disclosed in U.S. Pat. No. 5,939,491, which is hereby incorporated by reference. The curing agents of U.S. Pat. No. 5,939,491 are not necessary for the hydrophobic surface treatment composition disclosed herein.

Some silicone fluids useful herein have a viscosity at 25° C. ranging from about 1 to about 100,000 cps. Other silicone fluids may have a viscosity outside this range. In some preferred embodiments, the silicone fluid has a viscosity of about 2 to about 50,000 cps. Some other suitable silicone fluids have a viscosity at 25° C. ranging from about 5 to about 10,000 cps. In still other embodiments, the silicone fluid has a viscosity of about 25, about 50, about 100, or about 500 cps. Fluids with a viscosity of about 1000, about 2000, about 5000, or about 7500 cps are also suitable.

Suitable alkyl silanes are represented by the following general formula: $R^1_a SiX_{(4-a)}$ where $R^1$ is a monovalent hydrocarbon group having 3 to 20 carbon atoms. The following are specific examples of such groups: a propyl group, n-butyl group, pentyl group, n-decyl group, or a similar alkyl group; a cyclohexyl group, or a similar cycloalkyl group. X in the above formula is a hydrolyzable group, preferably a methoxy group, ethoxy group, propoxy group, or a similar alkoxy group, or a halogen such as Br, Cl, F, I. However, X may also be a phenoxy group, a ketooxime group, or an isopropenoxy group. In the above formula, a is an integer having a value of 1 to 3, 1 being preferable. The following are examples of the aforementioned organosilane component, but are not limited to: n-butyltrimethoxysilane, n-decyltrimethoxysilane, isobutyltrimethoxysilane, n-hexyltrimethoxysilane, and cyclohexylmethyldimethoxysilane. Alkyl silanes of the aforementioned type may be used separately or in a mixture of two or more. Alternatively a fluorinated hydrophobic silane can be used such as perfluorinated alkyl, ether, ester, urethane, or other chemical moiety possessing fluorine and a hydrolyzable silane.

Generally, the hydrophobic fluid is mixed with a solvent. Preferably, the solvent is miscible with the hydrophobic fluid. Suitable solvents include, but are not limited to, alkyl or aryl, substituted or unsubstituted alcohols, ethers, esters, or hydrocarbons having between 1 and 40 carbon atoms. In some embodiments the solvent is water. Other solvents have a boiling point ranging from about 40° C. to about 220° C. Preferably, the solvent has a boiling point ranging from about 50° C. to about 180° C. However, any solvent that is miscible with the employed hydrophobic fluid may be used.

Some suitable alcohols for use as the solvent include, but are not limited to, methanol, ethanol, isopropanol, or isobutanol. In some other embodiments, the solvent is 1-propanol, 2-propanol, 1-butanol, 2-butanol, 3-butanol, tert-butyl alcohol, a methyl butanol, a dimethyl butanol, 1-propanol, 2-propanol, 3-propanol, cyclohexanol, phenol, tert-butyl phenol, 2-ethylhexanol, 2-ethoxyethanol, 1-dodecanol, or mixtures thereof.

The additive particles 10 may be brought into contact with the hydrophobic fluid in any convenient manner. For example, the additive particles 10 may be introduced batchwise into an alcoholic solution of the hydrophobic fluid to form a particle dispersion therein. Agitation by mechanical and/or ultrasonic means may be practiced to ensure sufficient mixing of the particles with the hydrophobic fluid. Treatment times can vary widely depending on the material. Thus, treatment times of between 1 second to 1 hour may be employed. Typically, treatment times of between about 1 minute to about 30 minutes will be sufficient. Following treatment, the resulting treated additive particles can be dried at elevated temperatures, e.g., the particles may be heated up to temperatures of between about 75° C. to about 130° C., typically between about 100° C. to about 120° C. in order to evaporate the solvent (if any). The particles will have the hydrophobic treatment covalently bonded or otherwise attached to the surface. The dried and treated additive particles may thus be incorporated into the coating material 20.

The coating material 20 may be any material which is compatible with the additive particles 10. Most preferably, the coating material 20 is a polymeric material selected from thermoplastic polymers (e.g., polyolefins, polyamides, polycarbonates, polyesters, and polystyrene), curable polymers (e.g., polyacrylics, polyepoxides, polyureas, and polysilicones) and the like. The additive particles 10 may be dispersed into the coating material 20 while the latter is in a liquid form (e.g., in a melt phase, solvent phase or the like) by mixing the additive particles using known techniques. The liquid coating material 20 with the additive particles 10 dispersed therein may then be applied to the substrate 18 in a conventional manner, for example, by spraying, roll coating, dipping, pouring, padding or the like. The liquid coating material 20 with the additive particles 10 dispersed therein may then be allowed to solidify (e.g., by cooling, solvent removal, radiation curing, heat curing or the like) on the substrate 18 to thereby form a coating layer of the coating system 16 thereon.

Alternatively, the liquid coating material 20 may first be applied onto the surface of the substrate 18 and, while still liquefied, the additive particles 10 may be brought into contact with the coating material 20 (e.g., by spraying the additive particles onto the liquid coating material 20). Thereafter, the coating material 20 may be allowed to solidify on the surface of the substrate 18 to thereby form a coating layer of the coating system 16 thereon.

The amount of the additive particles 10 employed in the coating material 20 is sufficient to impart superhydrophobic properties to the coated substrate 15. Thus, the amount of the additive particles 10 is such that the additive particles 10 are exposed sufficiently to cause the coated substrate 15 to exhibit a contact angle of greater than about 150° for a 1 µl water droplet. Most preferably, the additive particles 10 are present in an amount so as to achieve an exposure of at least about 10%, preferably at least about 90% per unit area of the coating material 16. Thus, the percentage of the additive particles that will preferably be exposed range between about 10% up to 100%.

The amount of surface exposure of the additive particles 10 may be enhanced by incorporating the additive particles 10 in a coating material 20 which has a greater apparent density. That is, the superhydrophobic nature of a coating or surface treatment is dependant upon the surface characteristics of the coating system 16. Thus, only the first several nanometers of the coating thickness of the coating system 16 is directly responsible for the ultimate wettability of the coating. Therefore, it is desirable for the additive particles 10 to be concentrated at the surface of the coating system 16.

One way to achieve such apparent density difference between the additive particles and the coating material 20 is to employ hollow carrier microparticles 12a (e.g., as shown in FIG. 1B). Additive particles 10' prepared from hollow carrier microparticles 12a as described herein will therefore allow the additive particles 10' to rise to the surface of the coating system 16 layer due to their lower apparent density. As such, the use of hollow carrier microparticles 12a will be advantageous since a lesser quantity of the additive particles 10' may be employed to achieve superhydrophobic properties as compared to the case in which the additive particles are more uniformly distributed through the thickness of the coating. In some embodiments therefore the apparent density of the additive particles 10 or 10' will be at least about 5%, and preferably at least about 20% less than the apparent density of the coating material 20.

In general, the additive particles 10 or 10' will typically be incorporated into the coating material 20 in an amount between about 5 to about 50 wt. %, and preferably between about 5 to about 20 wt. %, based on the total weight of the coating system 16 (i.e., the weight of both the additive particles 10 and the coating material 20). As described above, a lesser amount of some additive particles (e.g., those based on hollow carrier microparticles and/or hollow nanoparticles) may be employed to achieve comparable superhydrophobicity since the additive particles present will be concentrated near the layer surface of the coating system 16 on the substrate 18. However, a greater amount of additive particles may be needed if the particles are to be distributed more homogenously throughout the coating thickness.

The additive particles 10 and/or the surface of the coating material 20 in which such additive particles 10 are incorporated will exhibit superhydrophobic properties. That is, the additive particles 10 and/or the surface of the coating material 20 in which such additive particles are incorporated will exhibit a contact angle ($\theta$) of greater than 150° using the drop shape method of contact angle measurement.

The actual coating layer thickness of the coating system 16 is not critical. Thus, coating thicknesses of about 0.5 mil or greater may be applied onto the underlying substrate. Preferably, however, coating layer thicknesses of between about 1 mil to about 10 mil may be employed, with coating thicknesses between about 2 to about 6 mil being especially preferred.

The present invention will be further understood from the following non-limiting Examples.

EXAMPLES

Example 1

Particle Surface Treatment

A. Amino Functionalized Silica ($SiO_2$:$NH_2$)

3-aminopropyl triethoxysilane, $NH_2(CH_2)_3Si(OC_2H_5)_3$, (0.2 g, 0.90 mmol) was added to 95% ethanol (50 ml). The pH of the solution was lowered to about 5 with the addition of acetic acid, and was allowed to stand for 5 minutes. $SiO_2$ particles with an average diameter of about 60 μm (1 g) was added, and the suspension was treated in an ultrasound bath for 20 minutes. The ethanolic suspension was heated to dryness on a hot plate, and the resulting powder was then heated in an oven at 110° C. overnight to remove excess silane and obtain amino functionalized silica particles. This technique was repeated using silica particles of the following average diameters: 60 μm, 40 μm, 14 μm, 12 μm, 0.5 μm, and 0.25 μm.

B. Epoxide Functionalized Silica ($SiO_2$:Epoxy)

The technique described above in Example 1A with reference to the amino functionalized silica was repeated except that 3-glycidyloxypropyl(trimethoxy)silane (0.2 g, 0.85 mmol) was reacted with the silica particles to obtain epoxide functionalized silica particles.

C. Fluorine Functionalized Silica ($SiO_2$:F)

The technique described in Example 1A above with reference to the amino functionalized silica was repeated except heptadecafluoro(1,1,2,2-tetrahydrodecyl)trimethoxy silane ($CF_3(CF_2)_7(CH_2)_2Si(OCH_3)_3$) (0.2 g, 0.33 mmol) was reacted with the silica particles to obtain fluorine functionalized silica particles.

Example 2

Covalent Bonding of Nanoparticles onto Carrier Microparticles

Figure 4:
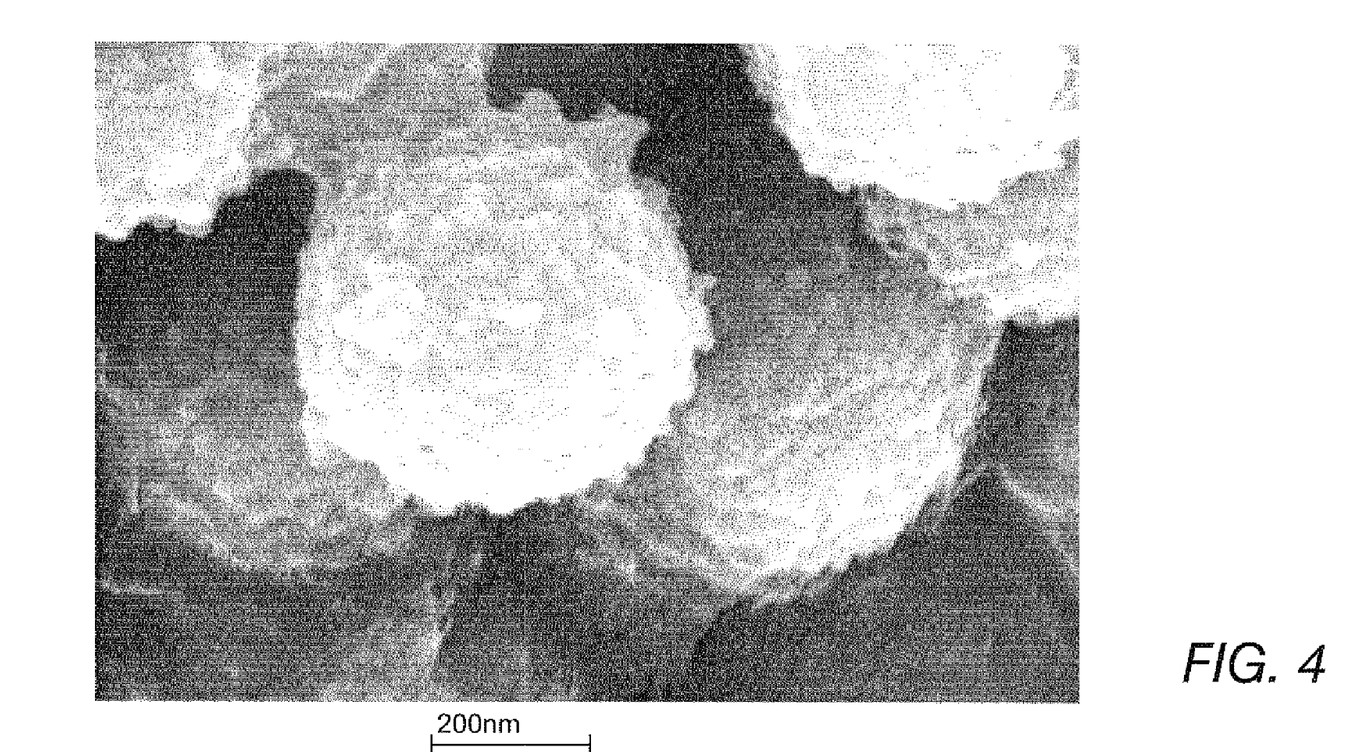
FIG. 4 is an SEM image at 290,540× showing the additive particles made in accordance with Example 2 below.
Figure 5A:
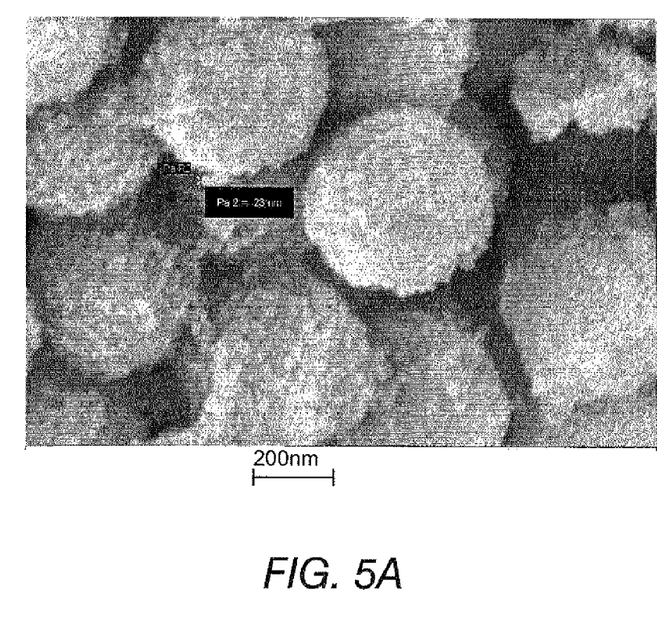
FIG. 5A is an SEM images at 177,000× magnification of $SiO_2$ carrier microparticles of approximately 0.4 μm effective diameter with $SiO_2$ nanoparticles of approximately 20 nm adhered to the surface which were made in accordance with Example 5, invention sample number 9 below.
Figure 5B:
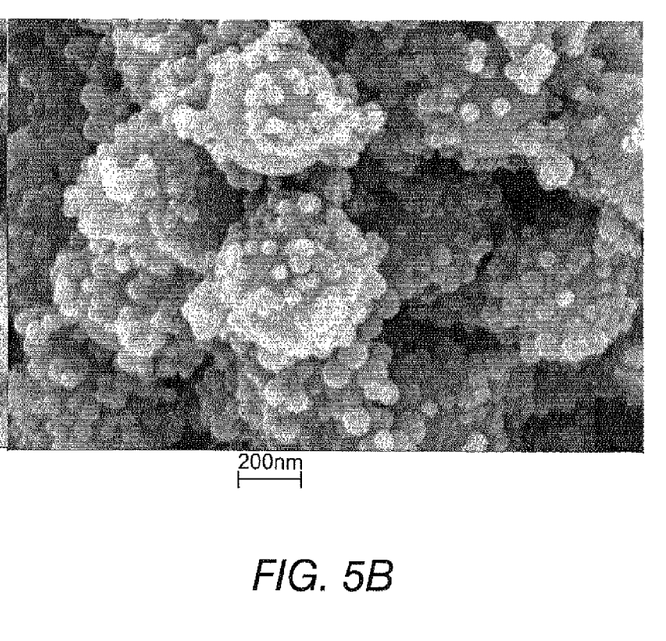
FIG. 5B is an SEM images at 177,000× magnification of $SiO_2$ carrier microparticles of approximately 0.4 μm effective diameter with $SiO_2$ nanoparticles of approximately 70 nm adhered to the surface which were made in accordance with Example 5, invention sample number 18 below.
Figure 6:
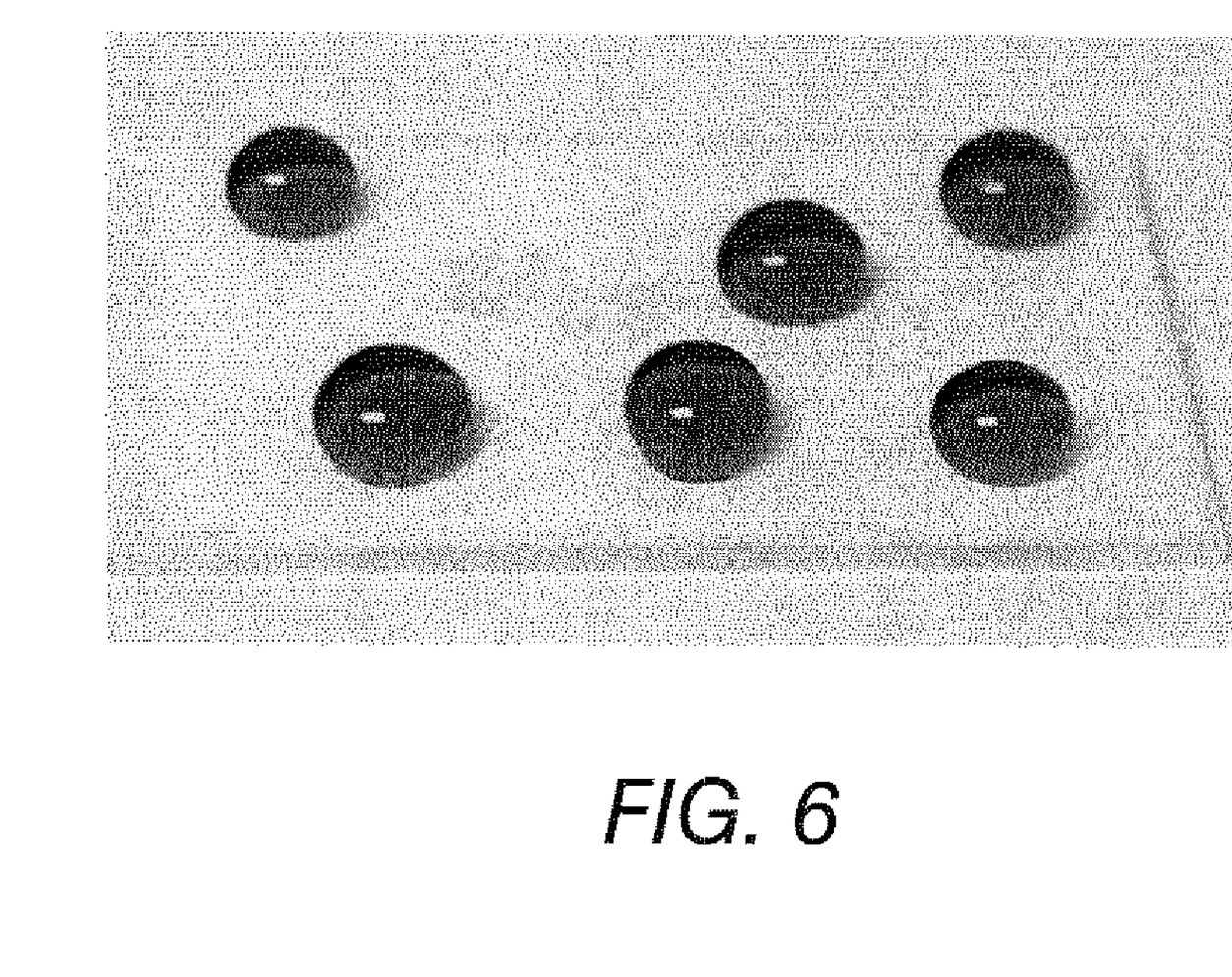
FIG. 6 is a photograph showing the superhydrophobic properties of a coated microscope slide made in accordance with Example 5, invention sample number 1 below.

Amino functionalized silica nanoparticles of selected sizes 15-500 nm) prepared according to Example 1A above were reacted with epoxy functionalized silica carrier microparticles of selected sizes (12-60 μm). the amino functionalized silica nanoparticles (0.1 g) were suspended in ethanol (50 ml), following which the epoxy functionalized silica carrier microparticles (1 g) were added). The solution was stirred for 1 hour under sonication, followed by stirring overnight. The solid was filtered out and dried at 100° C. in air. Scanning electron microscopy (FIG. 4) confirmed that the surface of the carrier microparticles were covered by nanoparticles.

Example 3A

Electrostatic Deposition of Nanoparticles onto Carrier Microparticles and Silicon Surface Treatment Anionic silica nanoparticles (Snowtex 40, 20-40 nm average particle diameter, Snowtex 20L, 40-50 nm average particle diameter and Snowtex ZI 70-100 nm average particle diameter—Nissan Industries) were deposited electrostatically onto cationic micron sized silica carrier particles. The electrostatic deposition process was performed by stirring the ammonium functionalized silica obtained in Example 1D above. The ammonium functionalized silica (1 g) was suspended in 80 ml $H_2O$, followed by the addition of 2 ml of the anionic silica nanoparticles. Upon stirring for 2 hours, the material was filtered, washed with water and dried at 100° C. overnight. Scanning electron microscopy showed that the particles were dual morphology, that is the surface of the microparticles was covered by nanoparticles.

Heptadecafluoro-1,1,2,2-tetrahydrodecyl)trimethoxy silane ($CF_3(CF_2)_7(CH_2)_2Si(OCH_3)_3$) (0.2 g, 0.33 mmol) was added to 95% ethanol (50 ml). The pH of the solution was lowered to approximately 5 with acetic acid, and was allowed to stand for 5 minutes. The dual morphology silica particles produced as described above (1 g) were added to the solution, and the resulting ethanolic particle suspension was treated in an ultrasound bath for 20 minutes. The ethanolic particle suspension was then subsequently heated to dryness on a hot plate. The resulting powder was then heated in an oven at 110° C. overnight to remove excess silane and obtain dual morphology hydrophobic particles.

Water contact angles were used as a measure of relative hydrophobicity for the dual morphology hydrophobic particles. Dual morphology particles before and after fluorosilane treatment in accordance with this Example were stuck to double sided tape on a glass slide. Water contact angles were measure with a 1 μl water droplet using a contact angle goniometer. The table below shows that superhydrophobic character is obtained with the fluoro silane modified dual morphology particles.

| Additive Particles (Dual Morphology) | Untreated | Treated with Perfluorinated silane |
|---|---|---|
| 20 nm particles on 60 μm $SiO_2$ particles | Wets out; contact angle ~0° | 160° |
| 40 nm particles on 60 μm $SiO_2$ particles | Wets out; contact angle ~0° | 158° |
| 70 nm particles on 60 μm $SiO_2$ particles | Wets out; contact angle ~0° | 159° |

Example 3B

Fluorine Functionalized Silica

Silanol (Si—OH) terminated polydimethylsiloxane (XL-Sil R65 commercially available from the Performance Chemicals Division of Fibro Chem, LLC) (2 g) was added to 300 ml acetone. The pH was reduced to 5 with acetic acid and stirred for 10 minutes. Non-surface treated dual morphology particles produced in Example 3A (40 g) above were added to the solution and heated to reflux (~56° C.) for 1 hour. Evaporation of the acetone solution left a white hydrophobic powder with a water contact angle of 157°.

Example 4

Titania particles can be used as either the carrier particle or the nanoparticle in a similar fashion.

A. Titania carrier with silica surface particle—Titania particles with a diameter of 15 nm (Nanostructured and Amorphous Materials Inc) were used in place of silica as in Example 1A. The same ratios of ingredients were used to functionalize them with amino groups. To these were attached 10-20 nm anionic silica nanoparticles (Snowtex 40) by the same method as in Example 3A.

B. Silica carrier particle with titania surface particle— Conversely, anionic colloidal titania (NanoTek titania (5 nm), NanoPhase Technologies) can be used in place of the anionic silica to place titania on the surface of silica by the same method as Example 3A.

Example 5

Superhydrophobic Coating Material Prepared by Surface Application of Additive Particles A two-component curable polyurethane coating material (Desothane® HS polyurethane commercially available from PRC-Desoto International) was mixed in the manufacturer required ratios (3:1 (v/v) Part A and Part B). The polyurethane coating material was cast onto glass microscope slides to a dry thickness of 2 to 6 mils. Before complete curing could occur (i.e., within about 2 minutes of casting), additive particles made in accordance with Example 3A above were applied onto the top surface of the coating so as to give a substantially uniform coverage. The coating material was then allowed to cure at room temperature. Static contact angle measurements were obtained using 1 μl droplets of water and a commercially available contact angle instrument (Model 125 from First Ten Angstroms of Portsmouth, Va.). The results appear in Table 1 below.

TABLE 1

Droplet Contact Angles for Coatings

| | Carrier Microparticle Size (μm) | Identity | Nanoparticle Size (nm) | Identity | Contact Angle (degrees) |
|---|---|---|---|---|---|
| Comparative Samples | | | | | |
| 1 | — | — | — | — | 80.2 |
| 2 | 40 | $SiO_2$ | — | — | 137.2 |
| 3 | 12 | $SiO_2$ | — | — | 131.3 |
| 4 | 0.5 | $SiO_2$ | — | — | 123.2 |
| 5 | 0.015 | $TiO_2$ | — | — | 126.5 |
| Invention Samples | | | | | |
| 1 | 60 | $SiO_2$ | 5 | $TiO_2$ | 152.0 |
| 2 | 40 | $SiO_2$ | 5 | $TiO_2$ | 155.0 |
| 3 | 12 | $SiO_2$ | 5 | $TiO_2$ | 150.2 |
| 4 | 0.5 | $SiO_2$ | 5 | $TiO_2$ | 157.9 |
| 5 | 0.015 | $TiO_2$ | 5 | $TiO_2$ | 145.0 |
| 6 | 60 | $SiO_2$ | 20 | $SiO_2$ | 157.0 |
| 7 | 40 | $SiO_2$ | 20 | $SiO_2$ | 146.0 |
| 8 | 12 | $SiO_2$ | 20 | $SiO_2$ | 146.4 |
| 9 | 0.5 | $SiO_2$ | 20 | $SiO_2$ | 160.0 |
| 10 | 0.25 | $SiO_2$ | 20 | $SiO_2$ | 143.7 |
| 11 | 0.015 | $TiO_2$ | 20 | $SiO_2$ | 159.4 |
| 12 | 60 | $SiO_2$ | 40 | $SiO_2$ | 159.2 |
| 13 | 0.5 | $SiO_2$ | 40 | $SiO_2$ | 151.8 |
| 14 | 0.015 | $TiO_2$ | 40 | $SiO_2$ | 157.9 |
| 15 | 60 | $SiO_2$ | 70 | $SiO_2$ | 160.1 |
| 16 | 40 | $SiO_2$ | 70 | $SiO_2$ | 136.8 |
| 17 | 12 | $SiO_2$ | 70 | $SiO_2$ | 164.1 |
| 18 | 0.5 | $SiO_2$ | 70 | $SiO_2$ | 157.9 |
| 19 | 0.015 | $TiO_2$ | 70 | $SiO_2$ | 155.0 |

It will be observed that use of only the carrier microparticle in the coating material did not impart superhydrophobicity (i.e., Comparative Samples 2-5 all had contact angles of less than 150°). In contrast, the additive particles in accordance with the present invention (i.e., Invention Samples 1-19) imparted superhydrophobicity to the coating material since contact angles of 150° and greater were obtained.

Example 6

Superhydrophobic Coating Material Prepared by Direct Blending of Additive Particles with Coating Material Example 1 was repeated except that the additive particles having 20 nm nanoparticles electrostatically adhered to the surface of 60 μm carrier particles made in accordance with Example 3A were directly blended with the polyurethane coating material in the amounts specified in Table 2 below. Specifically, 100, 200 and 300 milligrams (mg) of the additive particles were added per gram of the polyurethane coating material along with 1 ml of butyl acetate. The coating solution was blended and cast at a dry thickness of between 2-6 mil onto glass microscope slides and allowed to cure at room temperature following which contact angles were determined. The results appear in Table 2 below.

TABLE 2

| Additive Particle Loading (mg) | Contact Angle |
|---|---|
| 100 | 142.3 |
| 200 | 150.1 |
| 300 | 152.3 |

Example 7

Additional Coating Materials Containing the Superhydrophobic Additive Particles

Example 1 was repeated except that the additive particles of Invention Sample 6 were incorporated into other commercially available coating materials as identified in Table 3 below. Contact angles were determined for the "neat" coating material (i.e., having no additive particles) and for the modified coating material (i.e., having additive particles incorporated therein). The results are shown in Table 3 and demonstrate that the additive particles of the present invention may be employed across a variety of coating material platforms so as to impart superhydrophobicity to coated substrates.

TABLE 3

| Host Coating Material | Coating Type | Contact Angle (degrees) |
|---|---|---|
| Desoprime ® Epoxy (PPG Industries) | Neat coating Modified Coating | 80.2 153.0 |
| SW64159 Polyurethane (Sherwin Williams) | Neat coating Modified Coating | 85.1 153.5 |
| Epoplex Epoxy (StonCor Group, Inc.) | Neat coating Modified Coating | 79.3 153.3 |

Example 8

Figure 7A:
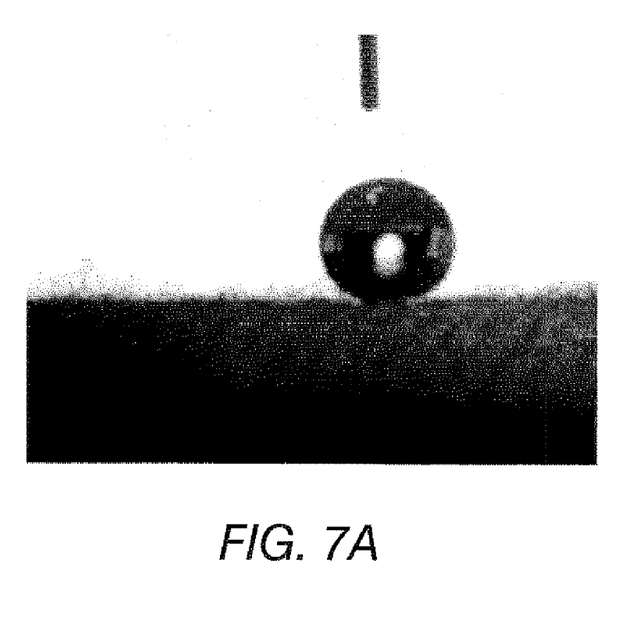
FIGS. 7A and 7B are photographs at 20× and 30× magnification, respectively, showing the superhydrophobic properties of a coated textile substrate made in accordance with Example 8 below.
Figure 7B:
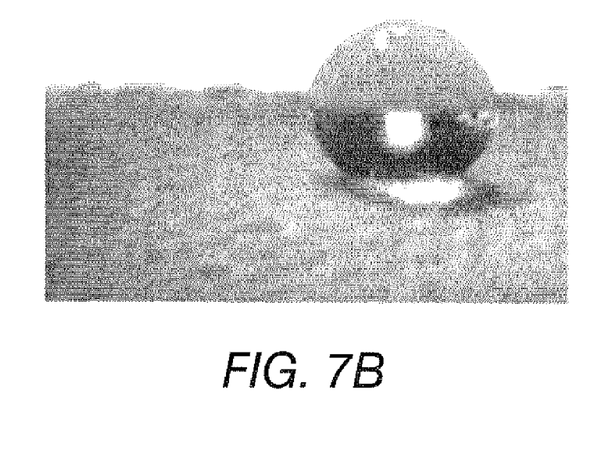

Preparation of Superhydrophobic Fabrics 100 mg of hydrophobic particles (40 nm $SiO_2$/15 nm $TiO_2$) were add to 2 g of a commercially available textile finishing solution (2U41-347 available from Shawmut Inc.) After mixing for 6 minutes, a swatch of fabric (50:50 cotton:polyester) was wetted with the solution in a Petri dish. The excess solution was removed by pressing with a roller over the fabric. The swatch was then heated at 120° C. for 2 hours. The swatch was then treated with heptadecafluoro-1,1,2,2-tetrahydrodecyl)trimethoxy silane ($CF_3(CF_2)_7(CH_2)_2Si(OCH_3)_3$) (0.2 g, 0.33 mmol) in ethanol (10 g). After heating at 110° C. for 1 hour, the hydrophobicity of the fabric was determined by measuring the contact angle of a sessile droplet on the modified fabric surface. The fabric exhibited a contact angle of 155°. Accompanying FIGS. 7A and 7B show the superhydrophobicity of the modified fabric surface at a magnification of 20× and 30×, respectively.

Example 9

Polymeric Microsphere Synthesis

Polyacrylic acid microspheres were prepared by the reverse emulsion polymerization of acrylic acid. A solution of sodium hydroxide (90 g) dissolved in water (360 ml) was added dropwise to acrylic acid (216 g) at 5° C. Methylenebisacrylamide (15 g) was added to the monomer solution in small increments with stirring. Meanwhile, SPAN 80 (35 g) was dissolved in toluene (1750 g) in a stirred reactor purged with nitrogen. Potassium peroxydisulfate (12.6 g) was added prior to addition of the monomer solution. The monomer solution was added to the toluene solution in 10 ml aliquots with vigorous stirring using an overhead stirrer while the temperature was maintained below 50° C. The resultant solid particles were filtered, washed with acetone and dried under vacuum. These particles had a diameter of about 50 μm, and were anionically charged.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An additive particle comprising a carrier microparticle, a plurality of nanoparticles adhered to and substantially covering a surface of the microparticle, and a hydrophobic surface treatment material in contact with exposed surfaces of the carrier microparticle and/or the nanoparticles sufficient to impart a superhydrophobic contact angle to the additive particle of greater than 150°.

2. The additive particle of claim 1, wherein the hydrophobic surface treatment material comprises a dried residue of a silicone fluid.

3. The additive particle of claim 1, wherein the hydrophobic surface treatment material comprises a perfluorinated alkyl silane.

4. The additive particle of claim 1, wherein the carrier microparticle has an effective diameter of less than about 200 μm.

5. The additive particle of claim 1, wherein the nanoparticles have effective diameters of less than about 200 nm.

6. The additive particle of claim 1, wherein the carrier microparticle has an effective diameter of between about 0.10 to about 100 μm, and wherein the nanoparticles have effective diameters of between about 1 to 100 nm.

7. The additive particle of claim 1, wherein the carrier microparticle has an effective diameter of between about 0.50 to about 60 μm, and wherein the nanoparticles have effective diameters of between about 5 to 70 nm.

8. The additive particle of claim 1 wherein the carrier microparticle and nanoparticles are formed of the same or different material selected from metal oxides, non-metal oxides, metals, metal alloys, phosphates, phosphonates, nitrides, sulfides, sulfates, and halides.

9. The additive particle of claim 1, wherein the carrier microparticle and nanoparticles are formed of the same or different metal oxide.

10. The additive particle of claim 1, wherein at least one of the microparticle and nanoparticles is formed of a metal oxide.

11. The additive particle of claim 10, wherein the metal oxide is silica, alumina, zirconia or titania.

12. The additive particle of claim 11, wherein both the microparticle and nanoparticles are formed of silica.

13. The additive particle of claim 11, wherein one of the microparticle and nanoparticle is formed of silica, and the other of the microparticle and nanoparticle is formed of titania.

14. The additive particle of claim 1, wherein at least one of the carrier microparticle and nanoparticles is hollow.

15. The additive particle of claim 14, wherein both the microparticle and nanoparticles are formed of silica.

16. The additive particle of claim 1 or 15, wherein the hydrophobic surface treatment material is comprised of a polysiloxane and/or an alkyl silane.

17. The additive particle of claim 16, wherein the polysiloxane and/or alkyl silane comprise 1 to 40 carbon atoms.

18. An additive particle comprising a carrier microparticle, a plurality of nanoparticles adhered to and substantially covering a surface of the microparticle, and a perfluorinated alkyl silane applied onto exposed surfaces of the carrier microparticle and/or the nanoparticles sufficient to impart a superhydrophobic contact angle to the additive particle of greater than 150°.

19. The additive particle of claim 1 or 18, wherein the nanoparticles are electrostatically adhered to the surface of the microparticle.

20. A coating system which comprises a coating matrix material, and additive particles incorporated with the coating matrix material in an amount sufficient to impart superhydrophobic properties to a substrate surface coated with the coating system, wherein the additive particles comprise a carrier microparticle, a plurality of nanoparticles adhered to and substantially covering a surface of the microparticle, and a hydrophobic surface treatment material in contact with exposed surfaces of the carrier microparticle and/or the nanoparticles, and wherein the additive particles have a superhydrophobic contact angle of greater than 150°.

21. The coating system of claim 20, wherein the hydrophobic surface treatment material comprises a dried residue of a silicone fluid.

22. The additive particle of claim 21, wherein the silicone fluid is comprised of a polysiloxane and/or an alkyl silane.

23. The additive particle of claim 22, wherein the polysiloxane and/or alkyl silane comprise 1 to 40 carbon atoms.

24. The coating system of claim 20, wherein the hydrophobic surface treatment material comprises a perfluorinated alkyl silane.

25. The coating system of claim 20, wherein the coating matrix material is a polymeric material.

26. The coating system of claim 20, wherein the additive particles have an apparent density which is sufficiently less than that of the coating matrix material to allow the additive particles to migrate to a surface of the coating matrix material.

27. The additive particle of claim 20, wherein both the microparticle and nanoparticles are formed of silica.

28. A substrate having a surface coated with the coating system of claim 20, wherein the substrate exhibits a superhydrophobic contact angle of greater than 150°.

29. The substrate of claim 28, wherein the coating matrix material is a polymeric material.

30. The substrate of claim 29, wherein the polymeric material is selected from thermoplastic polymers, thermoset polymers and curable polymers.

31. The substrate of claim 28, wherein the substrate is a rigid material selected from glass, ceramic, or metal.

32. The substrate of claim 28, wherein the substrate is a flexible material or may be in the form of a flexible material selected from films or sheets.

33. The substrate of claim 32, wherein the substrate is a fabric.

34. The substrate of claim 28, wherein both the microparticle and nanoparticles are formed of silica.

35. The substrate of claim 28 or 34, wherein the hydrophobic surface treatment material is comprised of a polysiloxane and/or an alkyl silane.

36. The substrate of claim 35, wherein the polysiloxane and/or alkyl silane comprise 1 to 40 carbon atoms.

* * * * *